H. G. SCHENCK.
GATE LATCH.
APPLICATION FILED FEB. 25, 1910.

989,649.

Patented Apr. 18, 1911.

*Fig.2.*    *Fig.4.*    *Fig.6.*    *Fig.7.*

*Fig.3.*    *Fig.5.*

WITNESSES
Wm L. Bushong.
L. B. Woerner.

INVENTOR
Harry G. Schenck,
By Minturn & Woerner
ATTORNEYS.

UNITED STATES PATENT OFFICE.

HARRY G. SCHENCK, OF DELPHI, INDIANA.

GATE-LATCH.

989,649.

Specification of Letters Patent.

Patented Apr. 18, 1911.

Application filed February 25, 1910. Serial No. 545,828.

*To all whom it may concern:*

Be it known that I, HARRY G. SCHENCK, a citizen of the United States, residing at Delphi, in the county of Carroll and State of Indiana, have invented certain new and useful Improvements in Gate-Latches, of which the following is a specification.

The object of the invention is to provide a latch mechanism which will be readily operated from either side of the gate and will be difficult for animals to unlatch.

I accomplish the objects of the invention by the mechanism illustrated in the accompanying drawing, in which—

Figure 1:
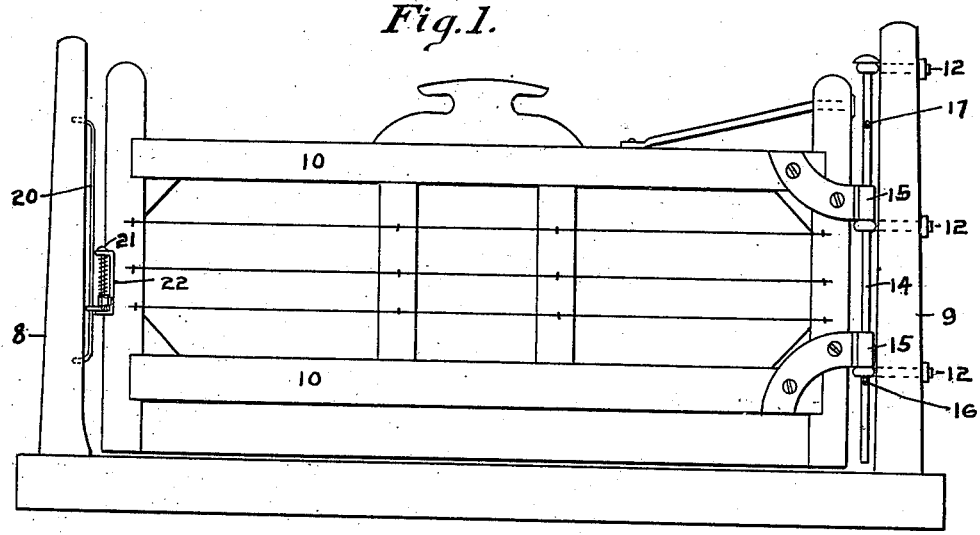
Figure 1:
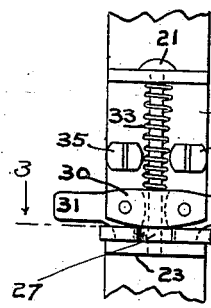
Figure 1:
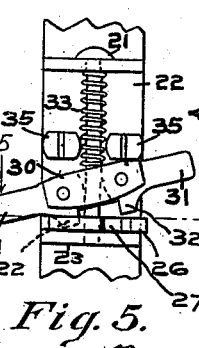
Figure 1:
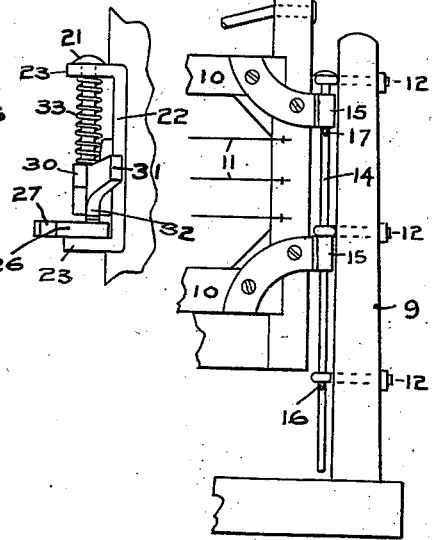
Figure 1:
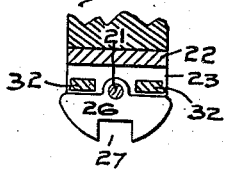

Figure 1 is a view in side elevation of a farm gate embodying my invention. Fig. 2 is an enlarged detail looking at that end of the gate which carries the latch, and showing the latch mechanism in elevation and in locked position. Fig. 3 is a horizontal section on the line 3—3 of Fig. 2. Fig. 4 is the same view as Fig. 2 except that the operating bar is raised at one end to allow the latch plate to release toward the raised end of said bar. Fig. 5 is a horizontal section on the line 5—5 of Fig. 4. Fig. 6 is a view of the latch looking in the direction of the arrow 6 in Fig. 4, and Fig. 7 is a detail in side elevation of the hinge-end of the gate showing the gate in its raised position.

Like characters of reference indicate like parts throughout the several views of the drawing.

8 is the gate post at the latch-end of the gate and 9 the post at the hinge-end.

10 is the gate which will be framed and braced in any suitable and usual manner and filled with the horizontal wires 11.

Secured to the post 8 is a catch-bar 20 which is of sufficient length to insure the engagement therewith of the latch on the gate at any vertical adjustment of the gate. The latch which is secured to and carried by the adjacent vertical frame member of the gate is assembled on a vertical bolt 21 supported by a plate 22 having upper and lower ends 23 at right angles to the part 22. These bent ends 23 are perforated for the passage of the bolt 21. Mounted upon the bolt 21 and resting upon the lower member 23 is a latch-plate 26 which is approximately semicircular in shape with a notch 27 in the front or curved edge of the plate to engage the catch-bar 20. The latch-plate 26 is adapted to be rocked about the bolt 21 within limitations which are prescribed by the contact of the ends of the latch-plate against the vertical plate 22. When the straight rear edge of the latch-plate is parallel with the plate 22 the catch-bar 20 within the notch 27 will lock the gate against swinging movement in either direction, but by tilting the latch-plate toward either side of the gate in the manner shown in Fig. 5 the engagement of the catch-bar by the latch-plate 26 will be released and the gate may be swung in the opposite direction of the notch 27 in the oblique position of the latch-plate. To lock the latch-plate against accidental movement to an oblique position, or movement except as desired, I provide an operating-bar 30 having ends which project laterally of the gate to form handles 31. This bar has an opening at its mid-length for the passage therethrough of the bolt 21, the opening being expanded from the middle outward in both upper and lower directions to allow the operating-bar to be tilted at either end. The bar 30 is also provided with two depending lugs 32, one of which is on each side of the bolt 21, and these two lugs when the operating-bar 30 is in its normal horizontal position fit down against the straight rear edge of the latch-plate 26 and block the plate 26 against the shifting of its position. The operating-bar 30 is held normally horizontal by spring 33 which bears against the top member 23 of the holding plate and against the top of the operating-bar 30. The spring 33 surrounds the bolt 21 and is held in place by the bolt. The plate 22 is secured to the gate by the two screws or bolts 35, the heads of which project sufficiently to form stops to limit the tilting of the operating-bar 30.

When it is desired to operate the latch from either side of the locked gate, the adjacent end of the operating-bar 30 is elevated into contact with its stop 35 which draws the lug 32 out of engagement with the latch-plate 26 thereby releasing that end of the latch-plate which will permit it to turn to an oblique position releasing the catch-bar, simply by pressure against the side of the gate. The latch-plate 26 will be held in this oblique position until it is returned to its normal square position by the contact of the opposite side of the notched plate against the catch-bar in the operation of closing the gate, and thereupon the pressure of spring 23 against the operating-bar 30 will move the bar 30 into a horizontal position locking the latch-plate.

Having thus fully described my invention, what I claim as new and wish to secure by Letters Patent of the United States, is—

In a gate latch, a holder to support the other parts of the latch, a notched horizontal latch-plate having a middle perforation, a bolt supported by the holder and passing through the perforated latch-plate, an operating bar having an opening through which the said bolt is passed, said bar having a pair of lugs adapted to lock against the edge of the latch-plate to prevent the tilting of said latch-plate, said operating bar adapted to be tilted endwise on the bolt to unlock a corresponding end of the latch-plate and a spring to press the operating bar into a position to lock the latch-plate against movement.

In witness whereof, I have hereunto set my hand and seal at Delphi, Indiana, this 21st day of February, A. D. one thousand nine hundred and ten.

HARRY G. SCHENCK. [L. S.]

Witnesses:
G. W. JULIEN,
JENNIE V. LAMB.

Copies of this patent may be obtained for five cents each, by addressing the "Commissioner of Patents Washington, D. C."